May 26, 1959 H. EPSTEIN 2,888,666

INPUT BUFFERING SYSTEM

Filed Sept. 16, 1953

RECIRCULATIONS

INVENTOR
HERMAN EPSTEIN
BY Raymond B. Parker
ATTORNEY

United States Patent Office 2,888,666

Patented May 26, 1959

2,888,666

INPUT BUFFERING SYSTEM

Herman Epstein, Philadelphia, Pa., assignor to Burroughs Corporation, Detroit, Mich., a corporation of Michigan Application September 16, 1953, Serial No. 380,494

2 Claims. (Cl. 340—173)

This invention relates to computing machines and particularly to input systems for computing machines wherein sonic delay lines are used for high speed dynamic storage.

The design of a computer for high speed operation, in order to enable it to more economically handle various complicated problems, involves the reduction of the operating time of components and component assemblies wherever possible. In the present status of the electronic computing art the external storage of computer input information commonly is in the form of data punched on record cards or paper tape, or registered as dots on film or as marks on a magnetic medium. Operations involving such storage systems occur, generally, at slower speeds than operations in the arithmetic of the system. One of the functions of input buffering systems is to transfer the data from the external storage at the right time and in the correct sequence for utilization by the computing machine. For example, it has been found that for particular applications it may be desirable to regroup the data in the external storage in a different sequence prior to presentation to the computing machine. Accordingly, an input buffering system for electronic computing machines is desirable wherein the data from an external storage device may be transferred to the machine at the right time and in the correct sequence with a minimum of equipment and time.

In some of the prior art devices the time required for transfer from external storage is relatively long and any regrouping of information necessarily further lengthens this time which tends to increase the over-all operating time of the computing machine. It has been found desirable in these cases to regroup the information prior to recording on the external storage so that it will be in the proper sequence for machine use. Because this may necessitate a manual operation by an operator it may be a possible source of error, as well as tending to increase the machine operating time. It has been found that through the use of sonic delay lines presently used as high speed dynamic storage devices the transfer time can be reduced due to their relatively rapid access time along with a provision for electronically regrouping the information as received from the external storage. The data in the external storage after being sensed and converted, when necessary, in terms of electrical pulses is applied in groups to a plurality of sonic delay lines. The information is sensed in preselected groups and each group is simultaneously delivered to an individual delay line and converted to a train by the delay line. Upon detection from the delay line the pulse train is recirculated back into the delay line and by appropriate means in the recirculation path the pulses are gated out in the desired sequence for presentation to the machine. This technique permits solving a complicated problem in a minimum of time, by modifying the equipment presently used in electronic computers.

A sonic delay line that has been found to be suitable not only as a high speed dynamic storage device but also readily adaptable for converting a group of pulses into a train to enable the regrouping of the pulsed information is the magnetostrictive sonic delay line. A magnetostrictive sonic delay line which may be used in connection with the novel input buffering system described in this application is described in the copending application of Herman Epstein et al. entitled "Magnetostrictive Delay Line," Serial No. 295,577, filed June 25, 1952, and assigned to the same assignee as this application.

The present invention is concerned with delivery of the pulses to a delay line in parallel and their emergence serially from the line to effect a parallel to serial transformation. The parallel input is achieved by employing a plurality of input transducers located along one end section of the delay line and a detecting or receiving transducer located a predetermined distance from the input transducers. The input transducers are physically spaced apart a predetermined distance linearly of the delay line so as to enable the pulses to be introduced into the line varying distances from the detecting transducer to effect a time delay between the pulses and thereby convert the pulses into a train. The detecting transducer is adapted to detect the acoustic pulse train and convert it to electrical pulses. An important feature of the invention is the provision for continuously recirculating the pulse train through the delay line and successively taking out pulses to regroup for whatever use they are intended. To this end, appropriate gating means may be employed to erase or take pulses out of the train while the pulses are recirculated so that the pulses may form a different sequence as recirculated in the line.

It is therefore a general object of the invention to provide an improved input system for computing devices.

It is another important object of the invention to provide a sonic delay line device designed for parallel to series conversion.

It is still another important object of the invention to provide a computer input system for electronically varying the input sequence of stored information.

It is a further important object of the invention to provide a sonic delay line device adapted to simultaneously receive electrical pulses at spaced positions in the direction of wave propagation along the line and convert such pulses into a train of pulses spaced apart in time.

It is still a further important object of the invention to provide an input system for a computing device wherein parallel input-series output conversion means includes a magnetostriction delay line having associated gating means for regrouping the sequence of stored information.

In accordance with the teachings of the present invention, there is, therefore, provided an improved input system for a computing machine utilizing a magnetostriction sonic delay line to effect a parallel input-series output conversion having appropriate erasing and reading gating means associated with the recirculation path to vary the input sequence of data for presentation to the computing machine at the correct time, whereby the machine operating time is reduced.

Other objects and features of advantage of the present invention will be found throughout the following more detailed description of the invention particularly when considered in connection with the accompanying drawings, in which like reference numerals indicate like elements:

Fig. 1 is a plan view of a record card adapted for use with the invention;

Figure 2:
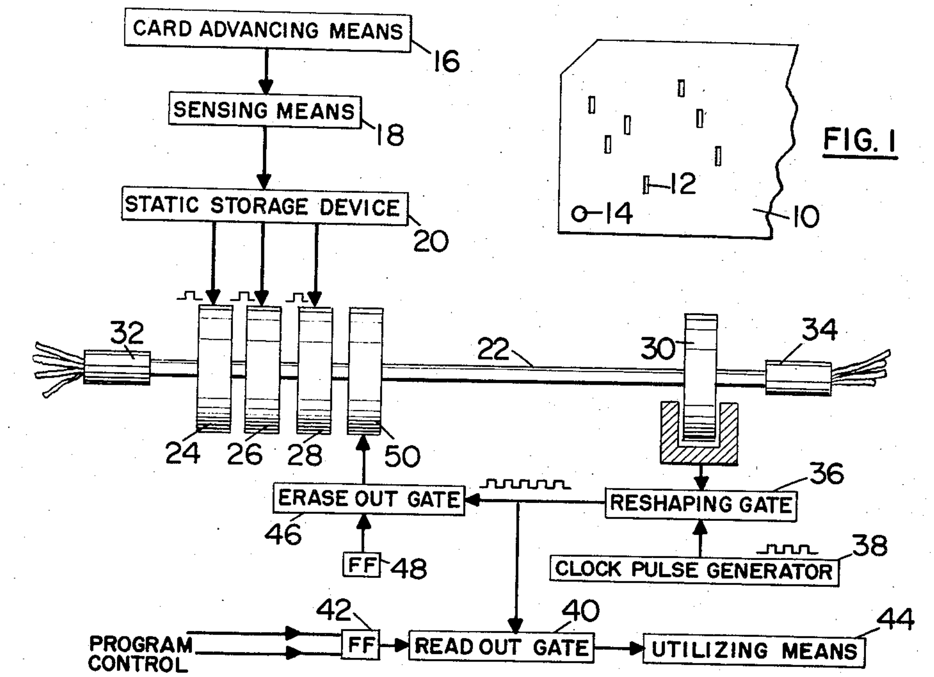
Fig. 2 is a block circuit diagram of an input buffering system according to the invention.

Referring now to Figs. 1 and 2, the invention can be more readily understood. The data that is to be presented to the computing machine may be stored by various media and merely for purposes of pointing out the principles of the invention a punched record card adapted for use with the invention will be used as exemplifying the permanent storage medium, it being understood that any suitable storage medium may be adopted for this purpose. The card, 10, is shown in Fig. 1 having information punched in accordance with a known code for presentation to a computing machine. In addition to the coded marks, 12, shown on the card, there is shown a mark, 14, of a different geometrical shape or position which is used for starting purposes. The cards containing the desired information are manually delivered by an operator to a card advancing means, 16, which presents each card to a sensing means, 18, for transforming the punched information into electrical energy. For purposes of explanation a bank of photocells may be employed as the sensing means for the punched record card, it being understood that any other sensing means suitable to this purpose may be used. After transformation of the punched information to electrical signals it may be found desirable to provide amplifiers and pulse shapers associated with the photocells to convert the electrical signals into discrete pulses.

Figure 3:
Fig. 3 is a graph illustrating the waveform of the input pulses as delivered to the delay line.
Figure 4:
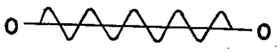
Fig. 4 is a graph illustrating the output waveform as detected from the delay line.

The pulses as shown in Fig. 3 represent the waveshape of the pulses as they emerge from the photocell converter output. The pulses may then be delivered to a buffer stage, 20, for static storage such as a magnetic shift register until called for by the computing machine. When the pulses are read out from the buffer stage, 20, their shape is substantially the same as shown in Fig. 3 and they are then simultaneously delivered to a dynamic storage device, 22. However, it is understood that the pulses need not be stored in a buffer stage but may be delivered directly to the dynamic storage device. In the illustrated embodiment of the invention, the dynamic storage device is in the form of a magnetostrictive sonic delay line and is thus identified by the reference character 22 in Fig. 2. The delay line has a plurality of input transducers, as indicated at 24, 26 and 28, positioned a predetermined distance apart from one another and longitudinally spaced along one end section of the delay line 22. These transducers may be in the form of magnetic coils encircling the delay line. As a result of this positioning a delay is introduced between the sonic pulses propagated down the line. An output transducer, 30, is positioned at the opposite end section of the line a predetermined distance from the input transducers. The output or receiving transducer upon detection thereof converts the sonic wave into an electrical signal, having a waveshape substantially as shown in Fig. 4. To prevent reflection of the waves, the magnetostrictive delay line has echo suppression means, 32 and 34, such as beeswax, fixed at each end along with fanning the end sections of the line into a plurality of leaves as illustrated in Fig. 2.

Figure 5:
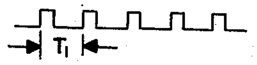
Fig. 5 is a graph illustrating the reshaped waveforms of Fig. 4 prior to being combined with the clock pulses.
Figure 6:
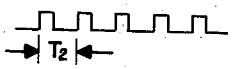
Fig. 6 is a graph illustrating the clock pulses.
Figures 7, 8, 9, 10:
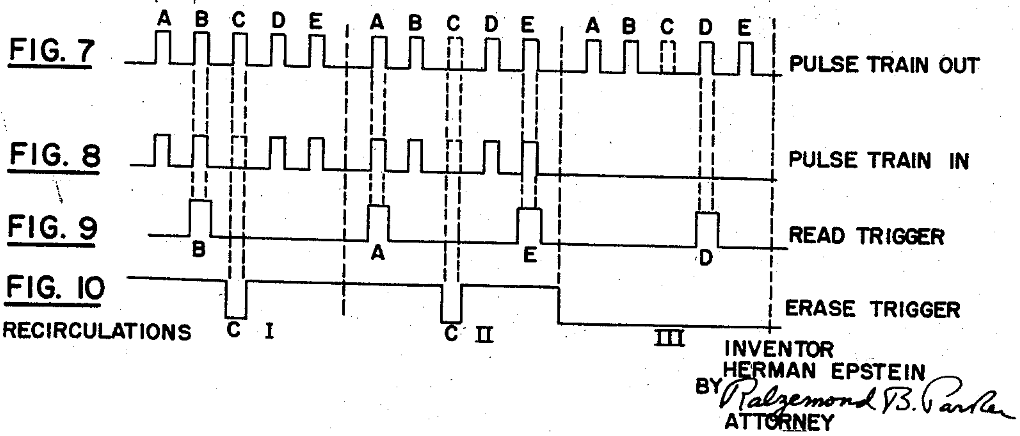
Fig. 7 is a graph illustrating the output pulse train upon successive recirculations.
Fig. 8 is a graph illustrating the input pulse train upon successive recirculations.
Fig. 9 is a graph illustrating the pulses controlling the read-out gate.
Fig. 10 is a graph illustrating the pulses controlling the erase gate.

The detected electrical signal is coupled to a reshaping device or gate, 36, which clips the negative portion of the signal and converts it into a pulse substantially as shown in Fig. 5. The pulse interval, $T_1$, varies slightly as a result of the dispersion on the line. To fix the pulse interval a clock pulse generator, 38, is coupled to the reshaping device. The output waveform generated in Fig. 6 has a fixed pulse interval, $T_2$, substantially as shown in Fig. 6. The pulse interval $T_2$ is governed by the linear spacing of the transducers 24, 26 and 28. The addition of the clock pulses to the dispersed pulses within the reshaping device results in a fixed interval pulse train substantially as shown in Fig. 7. The clock pulse generator, 38, is triggered into operation by the pulse generated by the electrical signal representing the starting mark, 14, on the punched card, 10. The starting mark tells the system when a card is presented to the sensing means to start the timing for the system. The length of time required for a given pulse to reach any particular point in the system may be determined and its path through the system controlled knowing the time of card presentation to the system.

The pulse train is delivered to a read-out gate, 40, which is controlled by a bistable device such as a flip-flop, 42, in turn controlled from the program control of the computing machine itself. The output waveform employed to trigger the read-out gate as derived from the flip-flop, 42, is substantially as shown in Fig. 9. Since the time of arrival of a pulse or pulse group representing certain information has been predetermined the desired pulse may be read-out by triggering the read-out gate upon arrival of the desired pulse to drop it out of the pulse train. Upon successive recirculations the pulses are dropped out in the desired sequence and delivered to the utilizing means, 44, of the computing machine.

The pulses that remain in the train are advanced to an erase gate, 46, which is also controlled by another bistable device or a flip-flop, 48, controlled from the computing machine. The waveshape of the pulses controlling the erase gate are shown in Fig. 10. The erase gate is controlled to allow only the pulses required by the utilizing means to pass through, the undesired pulses are thereby removed from the pulse train in the same manner as the read-out is accomplished. The pulses remaining after erasure of the train which emerges from the erase gate are shown in Fig. 8 and are advanced to the input end section of the delay line, 22, and by means of a single transducer, 50, enter the delay line to be recirculated. The pulses are recirculated in this manner until they are all read-out or erased.

Referring now to Figs. 7 to 10, the method of changing the sequence of information is illustrated by representing each bit of information by a single pulse. Assuming that the pulse input sequences as delivered to the delay line is A—B—C—D—E as shown in Fig. 7 and the desired output sequence is B—A—E—D with the "C" information pulse erased out, the regrouping may be accomplished as follows: the pulse train leaves the reshaping gate, 36, in the same sequence as the input sequence and is delivered to the read-out gate, 40, which will allow the pulses of the train to advance unless triggered by the flip-flop, 42; at the time that the "B" pulse reaches the read-out gate, a pulse as shown in Fig. 9 is delivered from the flip-flop, 42, to the read-out gate and the "B" pulse is read-out of the train. The remaining pulses advance since the read-out gate is not again pulsed during the period of the first recirculation as seen in Fig. 9. The train then advances to the erase gate which allows the train to advance unless triggered. The erase gate is triggered upon arrival of the "C" pulse as shown in Fig. 10 and thereby erases out the "C" pulse. The remaining pulses as shown in Fig. 8 are redelivered to the delay line and recirculated. During the second recirculation the read-out gate is pulsed upon arrival of the "A" and "E" pulses and read out and on the third recirculation the "D" pulse is read-out, as shown in Fig. 9. The erase gate is open during the interval of time allowed for the third recirculation and the delay line is cleared and ready to accept the next group of information.

As mentioned hereinbefore, it may be desirable in certain applications to omit the storage buffer 20 and deliver from the sensing means 18 directly to the delay line. In that case the time required to read the information out of the static storage is eliminated and the transfer time further reduced.

The punched record card may be arranged so that the plurality of columns running horizontally on the card are read in parallel and delivered to a corresponding plurality of delay lines. The information pulses on each delay line can then be regrouped in accordance with the method described above. In the applications where it has been found desirable to use only one delay line, the invention may be realized through the use of proper timing and delays so as to interlace the pulsed information.

The speed capabilities of the present input system depend on the amount of stored information, the recirculating frequency and whether a single or a plurality of delay lines are used. The recirculation frequencies possible with the magnetostrictive sonic delay line may range up to 1 megacycle. The frequency selected will necessarily be dependent on the individual input system characteristics. Assuming a fixed recirculating frequency, the use of a single delay line will not allow as many recirculations and therefore regroupings as is possible with a plurality of lines since all the recorded information is stored on a single delay line. If a record card having 12 horizontal and 80 vertical columns is used, the single delay line will be required to store approximately 1000 information bits, whereas if a delay line is employed for each row and the information is read along the rows in parallel, each delay line need store only 80 information bits.

Merely for purposes of illustration, if a record card is read in parallel with a sonic delay line for each horizontal row and a 2 microsecond delay is provided between each input transducer the length of the delay lines would be equivalent to approximately 200 microseconds (80 bits×2 microseconds=160 microseconds). The 200 microsecond delay line will allow a maximum of 5000 recirculations per second and therefore 5000 regroupings. If a single delay line is used it would have to be about 2 milliseconds long (1000 bits×2 microseconds=2000 microseconds) and will allow a maximum of 500 recirculations per second and 500 regroupings.

As a practical example a comparison of the use of a single and a plurality (12) of delay lines is charted below which shows a 10:1 ratio of regroupings possible with the plurality of lines as opposed to the single line.

| | 12 Lines | Single Line |
|---|---|---|
| Speed | 50 Cards/Sec. | 50 Cards/sec. |
| Delay Line Length | 200 Microsec. | 2 Milliseconds. |
| Recirculate Time | 1/100 Sec. | 1/100 Sec. |
| Read Time | 1/100 Sec. | 1/100 Sec. |
| Recirculations | 50 | 5. |
| Regroupings | 50 | 5. |

It is therefore clear from the foregoing description that the present invention by providing an improved input system for a computing machine, wherein a magnetostrictive sonic delay line is utilized to effect a parallel to series conversion having the added provision of regrouping the pulsed information, has improved the state of the art so that the data transfer time for delivering data to the computing machine may be reduced along with the many other features of advantage.

Having therefore described detailed embodiments of the invention, setting forth its organization and its mode of operation, those features believed descriptive of the nature of the invention are defined with particularity in the appended claims.

What is claimed is:

1. The combination comprising, a permanent static storage device, means for sensing the permanent storage device and for providing electrical signals therefrom, a dynamic sonic storage device, a plurality of transmitting transducers coupled to the dynamic storage device for simultaneously receiving the electrical signals derived from the permanent storage device and for propagating the same as sonic disturbances within the device, a receiving transducer coupled to the dynamic storage device spaced from the transmitting transducers for reconverting each of the sonic disturbances to electrical signals, a single transmitting transducer coupled to the dynamic storage device intermediate the plurality of transmitting transducers and the receiving transducer, and a recirculation loop connected between the receiving transducer and the single transmitting transducer for introducing the electrical signals derived from the receiving transducer into said single transmitting transducer for repropagation within the dynamic storage device, the recirculation loop including means for reading out the electrical signals in a predetermined order and means for erasing out electrical signals prior to their arrival at said single transmitting transducer for recirculation.

2. In an electronic computer, the combination, comprising a permanent storage device, means for sensing the permanent storage device and for providing groups of electrical signals therefrom, a magnetostrictive sonic delay device, a plurality of transmitting transducers coupled in spaced relation to one end section of the magnetostrictive sonic delay device for simultaneously receiving the electrical signal groups derived from the permanent storage device and for propagating same as sonic disturbances within the sonic device, a receiving transducer coupled to the magnetostrictive sonic device and spaced from the transmitting transducers and for reconverting the sonic disturbances into electrical signals in the form of a signal train, a single transmitting transducer coupled to the magnetostrictive device intermediate the plurality of spaced apart transmitting transducers and the receiving transducer, and a recirculation loop connected between the receiving transducer and said single transmitting transducer for introducing the electrical signal train derived from the receiving transducer into said single transmitting transducer for repropagation within the magnetostrictive device, the recirculation loop including means for reshaping each of the electrical signals derived from the receiving transducer and providing time intervals between signals governed by the spacing of the plurality of transmitting transducers and further including means for reading out the reshaped electrical signals and thereby delivering same at the command of the electronic computer.

References Cited in the file of this patent

UNITED STATES PATENTS

| | | |
|---|---|---|
| 2,401,094 | Nicholson | May 28, 1946 |
| 2,495,740 | Labin et al. | Jan. 31, 1950 |
| 2,560,434 | Gloess et al. | July 10, 1951 |
| 2,594,358 | Shaw | Apr. 29, 1952 |
| 2,629,827 | Eckert et al. | Feb. 24, 1953 |
| 2,635,229 | Gloess et al. | Apr. 14, 1953 |
| 2,718,356 | Burrell et al. | Sept. 20, 1955 |
| 2,736,881 | Booth | Feb. 28, 1956 |
| 2,790,160 | Millership | Apr. 23, 1957 |

OTHER REFERENCES

Publication II, Automatic Digital Computation Proc. of a Symp. National Physics Lab., Mar. 25, 1953, pp. 199–210.

High Speed Computing Devices, McGraw-Hill Book Co., 1950, p. 347.